United States Patent

[11] 3,599,409

[72] Inventors Martin J. Whitney
East Moline;
William L. Forsberg, Moline, both of, Ill.
[21] Appl. No. 24,684
[22] Filed Apr. 1, 1970
[45] Patented Aug. 17, 1971
[73] Assignee International Harvester Company
Chicago, Ill.

[54] MAIN FRAME FOR CORN HEADS
8 Claims, 4 Drawing Figs.

[52] U.S. Cl. .................................................. 56/105
[51] Int. Cl. ............................................ A01d 45/02
[50] Field of Search ................................... 56/98, 103, 104, 105, 106, 119

[56] References Cited
UNITED STATES PATENTS
3,520,121 7/1970 Ashton et al. ................. 56/106
FOREIGN PATENTS
307,698 1/1969 Sweden ......................... 56/105

Primary Examiner—Antonio F. Guida
Attorney—Floyd B. Harman

ABSTRACT: A row-crop-gathering attachment having a plurality of row-crop-harvesting units that can be slid transversely of the attachment while being supported thereby. The row-crop-harvesting units can be releasably secured to the gathering attachment at selected locations to accommodate crops of various row spacings.

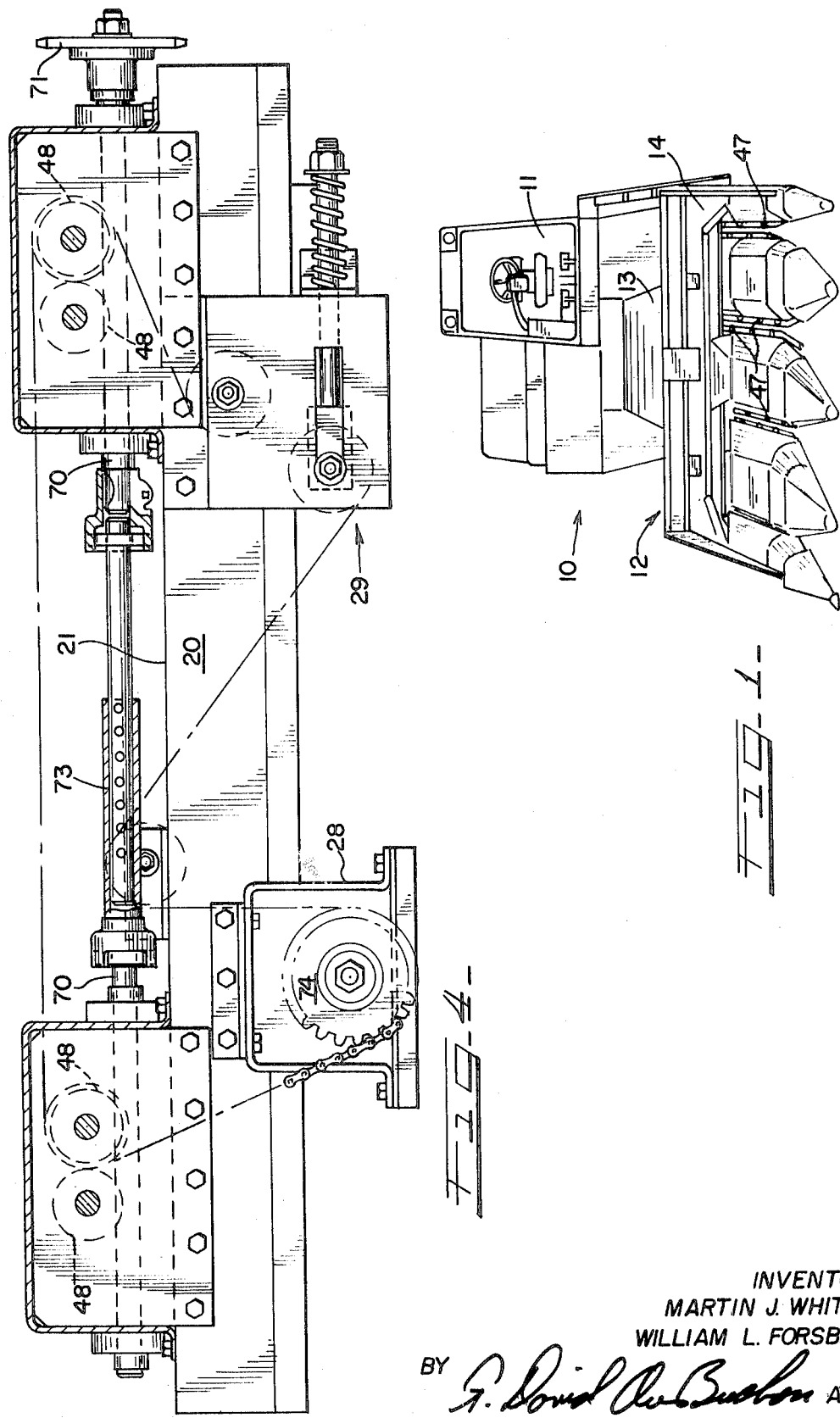

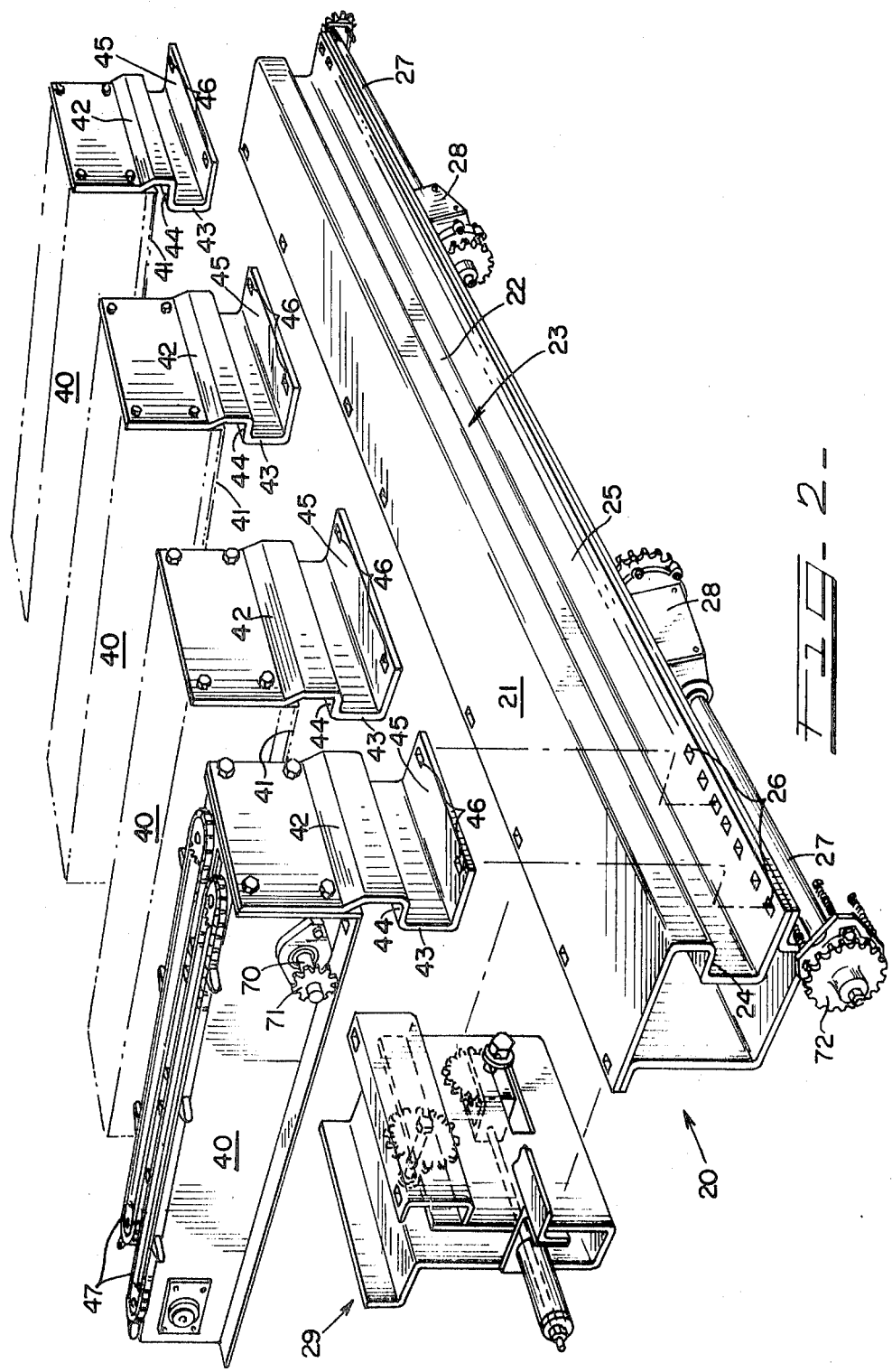

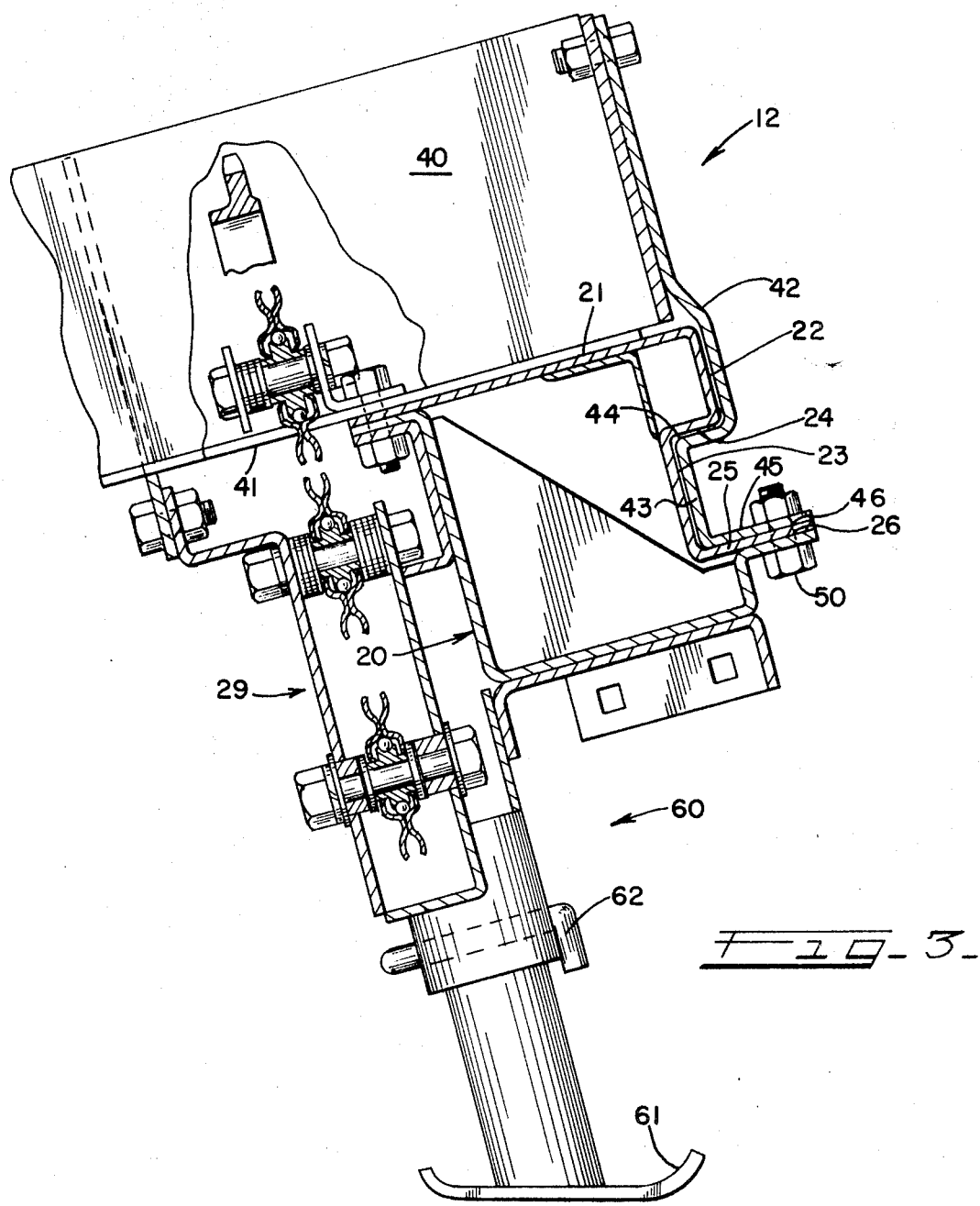

3,599,409

MAIN FRAME FOR CORN HEADS

BACKGROUND OF THE INVENTION

1. Field of the Invention

This invention relates generally to gathering and picking units for corn and other row crops and more particularly to the means for adjustably mounting the row crop units in the gathering or picking attachment.

2. Description of the Prior Art

A corn head attachment is mounted on a combine in lieu of the grain platform and functions to remove the ears of corn from the stalk and deliver them to the threshing mechanism of the combine. Reference is hereby made to the Karlsson et al. U.S. Pat. No. 3,101,579 of Aug. 27, 1963 for a disclosure of a conventional corn head. Corn heads are currently built to harvest a finite number (from two to eight) of corn rows. The space between rows of corn currently varies between 20 and 40 inches. Corn heads can be adjusted within a range so that they can harvest corn of various row spacing. For example, a corn head designed to harvest four rows of corn could be adjusted to handle rows spaced either 36, 38 or 40 inches apart. Since there is a separate picking unit for each of the rows, the drives to the individual picking units and the sheet metal housing must be designed to permit this adjustability. Reference is hereby made to the Ashton et al. U.S. Pat. No. 3,271,940 of Sept. 13, 1966 for an example of adjustable sheet metal housings and of drives to the individual row crop units that will permit transverse adjustment of the units. Although the prior art devices, such as disclosed in the above referred to Karlsson et al. and Ashton et al. patents, can be adjusted for various row spacings, special tools and a considerable amount of work are required to reposition the individual picking units and to recouple the drives.

SUMMARY

The general purpose of this invention is to provide a row-crop-harvesting unit which embraces all the advantages of similarly employed row-crop-harvesting units and possesses none of the above described disadvantages. To attain this, the present invention contemplates uniquely shaped anchor brackets for each row-crop-harvesting unit that cooperates with a uniquely shaped main frame to mount the harvesting units on the main frame such that they are fully supported thereby while permitting transverse sliding movement of the harvesting units relative to the main frame. The drives for individual harvesting units are interconnected with adjacent units and can accommodate with minimum work the change from one row spacing to another. The change can be accomplished while the corn head is mounted on the combine and requires a minimum number of replacement parts. It is an objective of this invention to provide a multirow crop harvester that can be readily adjusted for various row spacings without dismounting from the mobile unit and without the use of special tools and fixtures.

BRIEF DESCRIPTION OF THE DRAWING

FIG. 1 is a front view of a combine having a corn head mounted thereon;

FIG. 2 is an exploded view of the main frame and row-crop-harvesting units;

FIG. 3 is a side view of a portion of the corn head; and

FIG. 4 is a view of the drive for the row crop units looking toward the rear.

DESCRIPTION OF THE PREFERRED EMBODIMENT

Referring now to the drawings wherein like reference characters designate like or corresponding parts throughout the several views, there is shown in FIG. 1 a self-propelled combine designated 10 having an operator's platform 11. A corn head or row-crop-harvesting attachment 12 is connected to the combine 10 and is made up of a feeder portion 13 and a platform portion 14. The corn head shown in FIG. 1 is a four-row unit and includes an individual row-crop-harvesting unit for each of the four rows. The gathering chains 47 for several of the units are visible in FIG. 1. The remaining portions of the row-crop-harvesting units are covered by sheet metal which functions to deflect the corn stalks towards the row-crop-harvesting units. The row-crop-harvesting units 40 are mounted on an elongated transversely extending main frame 20 for adjustment along said main frame. The purpose for this adjustment is to adopt the corn head for the particular row spacing that is to be harvested. The sheet metal coverings for the row-crop-harvesting units are expandable and retractable to permit this adjustment as is well known in the art.

The platform 14 is built around the elongated transversely extending main frame 20 that can be best seen in FIG. 2. The main frame 20 is in the form of a tubular beam having a substantially flat upper surface 21 and an aft side 22. A transversely extending groove 23 is formed in the aft side 22. The upper surface of the transversely extending groove 23 is designated the first support surface 24. A rearwardly extending flange 25 has a plurality of apertures 26 formed therein. The drive shafts 27 and gear boxes 28 are carried by the main frame 20 and are visible in FIG. 2. The chain tighteners 29 also visible in FIG. 2 are carried by a row-crop-harvesting unit 40.

The individual fore and aft extending row-crop-harvesting units are designated 40 and in FIG. 2 the gathering chain 47 is illustrated on the foremost row-crop-harvesting unit. Each row-crop-harvesting unit 40 has a flat undersurface designated 41 and an anchor means 42 secured to and extending downwardly from the rearmost portion thereof. The anchor means 42 has a forwardly directed protrusion 43 which is shaped and dimensioned to be received by the transversely extending groove 23 formed in the main frame 20. The upper surface of the forwardly directed protrusion 43 is designated the second support surface 44. The anchor means 42 also has a trailing edge 45 in which there is formed a plurality of apertures 46. As is seen in FIG. 3, means such as a nut and bolt 50 extend through the apertures 46 of the anchor means and the apertures 26 of the main frame, thus, releasably locking a row-crop-harvesting unit in a selected position on the main frame.

As can be best seen in FIG. 3, the corn head 12 has a ground support 60 located adjacent each end of the main frame 20 for a purpose to be described. The ground supports 60 include a ground-engaging pad 61 and a pin 62 for securing the telescoping portions of the ground support in an adjusted position.

Referring now to FIG. 3, it can be seen that the substantially flat upper surface 21 is, during normal operation, inclined from front to rear such that the row-crop-harvesting unit 40 would tend to slide down the surface 21 towards the front of the machine. It becomes apparent when examining FIG. 3 that the row-crop-harvesting units 40 would tend to pivot in a counterclockwise direction relative to the main frame 20 and that this counterclockwise rotation is prevented by engagement of the first and second support surfaces 24 and 44 respectively.

There are two separate input drives to each of the row-crop-harvesting units 40. Each of these input drive is derived from the drive shaft 27, but through separate paths. This is important to the subject invention only in that the drives must be such that they will permit transverse adjustment of the row-crop-harvesting units 40. Each row-crop-harvesting unit 40 includes a horizontal drive shaft designated 70 through which drive is provided for the gathering chains 47. The horizontal drive shafts 70 of the outermost row-crop-harvesting units 40 have sprockets 71 secured thereto that are connected by a chain (not shown) to an aligned sprocket 72 (see FIG. 2) carried by the drive shaft 27. Telescoping coupler shaft 73 are provided to connect the horizontal drive shaft 70 of adjacent row-crop-harvesting units. (See FIG. 4) The length of the telescoping shafts 73 can be set by inserting a pin through aligned holes formed in the two sections.

The second input drive for the row-crop-harvesting units 40 are for the purpose of driving the stalk rolls designated 48. For this purpose, a sprocket 74 is carried by the output shaft of the gear box 28 which is aligned with sprockets carried by the row-crop-harvesting units 40 and the chain tightener 29. If a slight adjustment is made between adjacent row-crop-harvesting units 40 the chain tightener 29 can function to accommodate the change in required chain length. If larger adjustments in the row-crop-harvesting units are made then it is necessary to add or subtract links from the chain.

OPERATION

When it is desired to change the spacing between row-crop-harvesting units on the corn head, the corn head is elevated through the conventional hydraulic system of the combine and the ground supports 60 are set to support the platform 14 such that the row-crop-harvesting units are out of engagement with the ground and are suspended on the main frame 20. The telescoping coupler shafts 73 connecting adjacent units 40 are released to permit them to telescope upon themselves. The means 50 for locking the units 40 in a selected position are released and if a large adjustment is to be made, the chains 75 are opened. The necessary steps are taken to permit telescoping of the sheet metal. At this point, the harvesting units 40 are slidingly supported on the main frame 20 and can be slid transversely of the main frame to the new desired position. When the harvesting units 40 are properly located, the means 50 for locking them in the new position are reinserted, the telescoping coupler shafts 73 are adjusted and secured at their new lengths and the chains 75 are joined. At this point, the corn head would again be elevated by the hydraulic system of the combine and the ground supports 60 stored in their raised position.

What we claim is:

1. A row-crop-harvester attachment for mounting on a mobile unit comprising:

an elongated transversely extending main frame having a substantially flat upper surface and an aft side having a transversely extending first support surface, said first support surface being vertically spaced from said upper surface;

a plurality of fore and aft extending row-crop-harvesting units, each such unit having a substantially flat undersurface and anchor means extending downwardly from the rear of each unit, said anchor means including a second support surface vertically spaced from said undersurface;

said flat undersurfaces and said second support surfaces adopted to bear against said upper surface and first support surface respectively such that said row-crop-harvesting units are supported in cantilever fashion at the rear of the units on said transverse main frame and permitting transverse sliding of the row-crop-harvesting units relative to said transverse main frame;

and means for releasably locking said row-crop-harvesting units at a selective position relative to said main frame.

2. The invention as set forth in claim 1 wherein said substantially flat upper surface is inclined from front to rear.

3. The invention as set forth in claim 1 wherein said aft side of said main frame has a transversely extending groove formed therein, said groove extending the entire length of said main frame, the upper surface of said groove forming said first support surface.

4. The invention as set forth in claim 1 wherein said anchor means include forwardly directed protrusions, the upper surface of said protrusions forming said second support surfaces.

5. The invention as set forth in claim 2 wherein said aft side of said main frame has a transversely extending groove formed therein, said groove extending the entire length of said main frame, the upper surface of said groove forming said first support surface.

6. The invention as set forth in claim 2 wherein said anchor means include forwardly directed protrusions, the super surface of said protrusions forming said second support surfaces.

7. The invention as set forth in claim 3 wherein said anchor means include forwardly directed protrusions, the upper surface of said protrusions forming said second support surfaces.

8. The invention as set forth in claim 5 wherein said anchor means include forwardly directed protrusions, the upper surface of said protrusions forming said second support surfaces.

Disclaimer and Dedication

3,599,409.—*Martin J. Whitney*, East Moline, and *William L. Forsberg*, Moline, Ill. MAIN FRAME FOR CORN HEADS. Patent dated Aug. 17, 1971. Disclaimer and dedication filed Dec. 12, 1977, by the assignee, *International Harvester Company*.

Hereby enters this disclaimer to all claims and dedicates to the Public the remaining term of said patent.

[*Official Gazette April 18, 1978.*]